May 3, 1955
W. H. WIEST, JR
2,707,298
MAGNETIC WINDSHIELD SCRAPER
Filed Nov. 20, 1951
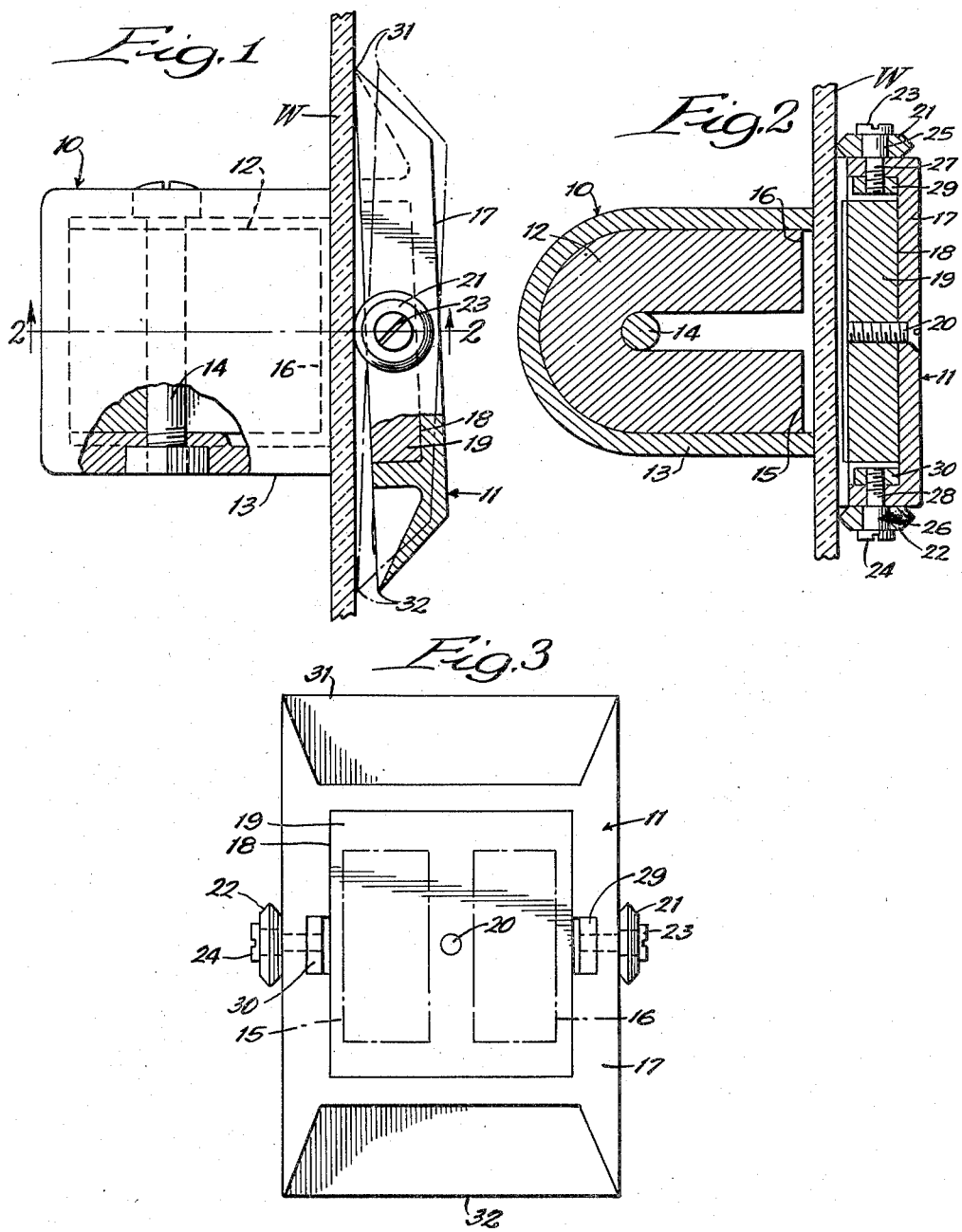
INVENTOR:
Waldo H. Wiest Jr.,
BY
Dawson & Ooms,
ATTORNEYS.

United States Patent Office 2,707,298
Patented May 3, 1955

2,707,298

MAGNETIC WINDSHIELD SCRAPER

Waldo H. Wiest, Jr., Chicago, Ill.

Application November 20, 1951, Serial No. 257,274

4 Claims. (Cl. 15—236)

This invention relates to a magnetic windshield scraper, and more particularly to an apparatus for removing snow and ice from the outside surface of an automobile windshield by remote control.

Under certain conditions of winter driving, the windshield wipers with which an automobile is normally equipped are inadequate in keeping the outside surface of the windshield free from snow and ice during the driving of the automobile. The ordinary windshield wipers only sweep over a segment of the outside surface of the windshield, and therefore snow and ice can accumulate around the segment traversed by the wipers. When the temperature of the outside air is near or below the freezing point of water, during a snow, sleet, or rain storm, snow and ice will collect on the windshield areas around the segment cleaned by the wiper, and will tend to freeze thereon. Thereafter, the area covered by the snow and ice will be gradually extended into the path of the windshield wiper, and may eventually cover the entire segment traversed by the windshield wiper. In order to prevent this from occurring, it is frequently necessary for automobile drivers to stop their vehicles to remove the snow and ice accumulated on the windshield. Therefore, there is a definite need for an apparatus for removing snow and ice from the outside surface of an automobile windshield, and particularly from the area of the windshield surrounding the segment traversed by the wiper, which can be operated from within the automobile while it is being driven.

Therefore, it is a primary object of this invention to provide an apparatus for removing snow and ice from the outside surface of an automobile windshield by remote control from within the automobile while it is being driven. However, it is also an object of this invention to provide an apparatus for removing snow and ice from the outside surface of an automobile windshield which can advantageously be used at other times for example, to remove snow and ice accumulated on the windshield when it has been left outdoors for a period of time during a snow storm. It is a specific object of this invention to provide a magnetic windshield scraper for use in supplementing the ordinary windshield wiper in keeping the outside surface of an automobile windshield completely free from snow and ice during the operation of the vehicle. Further objects and advantages will appear as the specification proceeds.

This invention is illustrated in a preferred embodiment in the accompanying drawing, in which—

Figure 1 is a side elevational view, partly in section, of an apparatus for removing snow and ice from the outside surface of an automobile windshield shown in operative position on a windshield; Fig. 2, a sectional view of the apparatus of Fig. 1 taken on line 2—2 thereof; and Fig. 3, a bottom view of the follower unit of Figs. 1 and 2.

In the illustration given, the apparatus includes generally a controller unit 10 adapted for movement over the inside surface of an automobile windshield W, and a follower unit 11 adapted for movement over the outside surface of windshield W in response to the movements of controller unit 10.

Controller unit 10 preferably has a permanent magnet mounted therein, although an electro-magnet can be employed. Either a bar-type permanent magnet or a horseshoe-type permanent magnet can be used. Best results are obtained by having both poles of the permanent magnet adjacent the inside surface of the windshield. It has been found that follower unit 11 can be controlled more effectively by means of a horseshoe-type magnet. In the illustration given there is shown a horseshoe magnet 12 snugly received within casing 13 and secured therein by means of bolt member 14 so that the poles 15 and 16 are supported in closely spaced relation to the inside surface of the windshield W, as indicated in Figs. 1 and 2. The edges of casing 10 around the inner end thereof provide surfaces adapted to slide over the inside surface of the windshield. Preferably, casing 10 is constructed of plastic or other suitable material which has a relatively low coefficient of friction with respect to glass.

Follower unit 11 can be constructed in a number of different ways, but it preferably includes a scraper blade supported at an inclination to the outside surface of the windshield with a sharp edge thereof normally resting against the surface, and has a piece of magnetic material carried by the blade, whereby when the poles of the magnet in the controller unit 10 are positioned opposite the piece of magnetic material carried by the blade, the sharp edge of the scraper blade will be pulled against the outside surface of the windshield with the result that the movement of the controller unit 10 in the direction of inclination of the blade in the follower unit 11 will effectively scrape the outside surface of the windshield.

In the illustration given, follower unit 11 includes a blade member 17 having a recess 18 in the inner surface thereof (that is, the surface adjacent the windshield when the follower unit is in operative position thereon) for receiving a flat piece of magnetic material 19, which is secured therein by means of screw 20. Magnetic member 19 is preferably a soft iron core which is capable of becoming magnetized by induction from permanent magnet 12. However, if desired, magnetic member 19 can be a permanent magnet of the bar-type.

It has been found highly advantageous to pivotally support scraper blade 17 for movement towards and away from the outside surface of the windshield, so that the blade will assume an inclination to the surface of the windshield with the sharp edge thereof resting thereagainst. Any suitable means can be employed for pivotally supporting blade 17. However, it is preferred that the pivotal supporting means also facilitate the movement of the blade over the outer surface of the windshield. In the illustration given, both of these objects are accomplished by supporting blade 17 on wheels 21 and 22, which are rotatably attached to blade member 17 by means of axle members 23 and 24. Axle members 23 and 24 have enlarged outer portions 25 and 26 about which wheels 23 and 24 rotate, and inner reduced portions 27 and 28 equipped with threads for receiving nuts 29 and 30.

Preferably, wheels 23 and 24 are positioned with respect to magnetic member 19 so that a substantial portion of member 19 lies between the pivotal axis of the plate and the sharp edge thereof. With this alignment when the centers of the poles of magnet 12 are placed opposite magnetic member 19 along a line displaced from the pivotal axis of blade 19 in the direction of the sharp edge, the sharp edge of scraper blade 17 will be releasably locked to the outer surface of the window during the movement of the controller in the direction of inclination of the scraper blade.

Blade 17 should provide at least one scraping edge, as indicated above. Preferably however, as in the illustration given, blade member 17 provides two oppositely disposed scraping edges 31 and 32, and the blade is pivotally mounted on an axis midway between scraping edges 31 and 32 and extends in parallel alignment thereto. In the illustration given, wheel members 23 and 24 are located midway between scraping edges 31 and 32 and are aligned to provide the required pivot axis. As indicated more clearly in Fig. 1, blade member 17 assumes an inclination to the outer surface of windshield W when either of the scraping edges 31 and 32 is resting thereagainst. It is also preferred that magnetic member 19 have a substantial portion thereof lying on both sides of the pivot axis of blade 17. If desired, as in the illustration given magnetic member 19 can be rectangular in shape and be attached to blade 17 so that its central axis coincides with the pivot axis of the blade. The advantage of this structure is that when the centers of the poles of magnet 12 are placed opposite the pivot axis, in the manner illustrated in Fig. 3, a slight displacement of the controller 10 relative to the follower 11 towards either scraping edge 31 or scraping edge 32 will cause the approached edge of the blade to snap against the outside surface of the windshield. Thus, when the controller unit 10 is in the preferred operative relation with respect to follower unit 11 both of the scraping edges 31 and 32 can alternately be brought into scraping relation with the outside surface of the windshield. This permits scraping of the windshield surface in two directions at the will of the operator, since the movement of the controller in one direction will hold one of the scraping edges against the outside surface as long as the movement is continued in the direction of inclination of the blade, while upon reversing the movement of the controller unit 10 and thereby of follower unit 11, blade 17 will pivot and the opposite scraping edge thereof will be brought into scraping relation with the outer surface of the windshield.

In actual operation, it has been found that the removal of snow and ice from the outside surface of the windshield is facilitated by having the scraping edges of the adjacent portions of blade 17 at a considerably greater inclination to the outer surface of the windshield than the body of the blade member. The greater inclination of the scraping edge portions is shown more clearly in Fig. 1. The particular inclination of the scraping edge portions of the blade member can be varied considerably, but it is desired that the scraping edges be oriented so that the edges will strike against the outer surface of the windshield with a substantially chopping action on the pivoting of the blade. In the illustration given, it has been found that by moving controller 10 back and forth with very short strokes that edges 31 and 32 can alternately be snapped against the outer surface of the windshield with a relatively powerful slapping or chopping action which has been found to be effective in breaking up the ice and snow on the outer surface of the windshield so that it can be scraped to the periphery of the windshield.

It has also been found that the removal of ice and snow is facilitated by providing wheels 23 and 24 with sharp-edged peripheries, as seen more clearly in Figs. 2 and 3. When wheels 23 and 24 are equipped with sharp-edged peripheries, it is possible to cut up the ice and snow on the outside surface of the windshield by simply moving follower unit 11 back and forth over the surface of the windshield. Also, the cutting action of wheels 23 and 24 serves to mark the edges of the path cleared by the scraping edges 31 and 32, and thus cooperates with the scraping edges in facilitating a clean removal of the ice and snow.

*Operation*

In the operation of an apparatus constructed in accordance with this invention, the controller unit 10 is held against the inside surface of the automobile windshield, while the follower unit 11 is placed against the outside surface of the automobile windshield and moved to a position directly opposite the controller. Preferably, as indicated in the foregoing, the controller unit 10 is positioned with respect to the follower unit 11 so that the centers of the poles of the magnet within the controller unit are on a line coinciding with the pivot axis of blade 17 of follower 11. If the correct relative position of the controller and follower units is illustrated in Fig. 3 of the drawing.

After the controller and follower units have been mounted respectively on the inside and outside surfaces of the automobile, the controller unit together with the follower unit can be moved to a corner of the automobile windshield or other area thereon where it will be out of the path of movement of the windshield wiper. It can conveniently be kept in this position until the need arises for removing snow and ice from the outside surface of the automobile windshield.

It will be apparent that the apparauts described herein can be readily used for removing snow and ice from the outside surface of the windshield while the vehicle is being driven. If the windshield wiper is being operated, it is preferable to temporarily stop the movement of the windshield wiper, and then to slide the controller unit 10 over the inside surface of the windshield so that the follower unit 11 moves over the outer surface of the windshield in response to the controller unit. As indicated above, when blade 17 is equipped with two oppositely disposed scraping edges 31 and 32, as is preferred, and the blade is supported on a central pivot axis, scraping of the windshield can be carried out in two directions. A slight displacement of the centers of the poles of magnet 12 from the pivot axis of blade 17 in the direction of one of the scraping edges will cause the edge approached to be brought against the outside surface of the windshield and to be held thereagainst as long as the movement of the controller is continued in the same direction. When it is desired to reverse the direction of scraping, it is only necessary to move the controller unit in the opposite direction to shift the centers of the poles of the magnet to the other side of the pivot axis of blade 17 and thus bring the opposite scraping edge against the outside surface. The pivotal mounting of blade 17 has the further advantage that the scraping edges are releasably locked to the surface during the scraping operation. If the resistance to the movement of follower 11 exceeds the force of magnetic attraction between the controller and follower units, blade 17 can rock on the pivot axis to allow the scraping edge against the window to ride over the pieces of ice or snow in the path of movement of the follower unit causing the follower to be forced away from the outside surface and out of attractive relation with the controller unit.

As indicated above, by having the scraping edges 31 and 32 inclined toward the outer surface of the windshield at a greater angle than the body of blade 17, the scraping edges can be made to strike against the outer surface of the windshield with a substantially chopping action. Thus, by moving the controller unit back and forth with relatively short strokes it is possible to cause first one scraping edge and then the other to strike sharply against the outer surface of the windshield to assist in breaking up the layer of snow and ice deposited thereon. The sharp edged peripheries of wheels 23 and 24 also cooperate effectively in cutting up the layer of ice so that it can be more easily removed by the scraping action of blade 17.

If controller unit 10 and follower unit 11 should be shifted out of the desired alignment during a scraping operation, they can be brought back into the proper alignment easily if the units are near the periphery of the windshield. By moving follower 11 against the rim surrounding the windshield, it can be held motionless while controller 10 is shifted with respect thereto, permitting the controller unit to be brought back into proper alignment with the follower unit. An adjustment of the alignment between the controller unit and follower unit can also be accomplished in the central portions of the windshield by lifting one leg of the magnet of the controller while holding the other leg thereof against the inside surface of the windshield, and rotating the controller on the leg remaining against the windshield. By this method, the controller unit can be walked to a different position with respect to the follower unit. However, it is generally easy to adjust the alignment of the controller and follower unit by moving the follower unit to the edge of the windshield.

In the foregoing specification this invention has been described in a particular embodiment for purpose of illustration and the details of the embodiment have been extensively discussed. However, it will be apparent to those skilled in the art that many of the details discussed herein can be varied widely without departing from the spirit of the invention.

I claim:

1. An apparatus for removing snow and ice from the outside surface of an automobile windshield by remote control, comprising a controller unit adapted for movement over the inside surface of said windshield, said controller unit having a permanent magnet mounted therein with both poles adjacent said inside surface, and a follower unit adapted for movement over the outside surface of said windshield in response to the movements of said controller unit, said follower unit including a blade providing two oppositely disposed scraping edges, wheel means rotatably connected to said blade for facilitating the movement of said follower unit and for pivotally supporting said blade on an axis between said scraping edges and generally parallel thereto, said blade assuming an inclination to said surface when either of said scraping edges is resting thereagainst, and a piece of magnetic material rigidly connected to said blade and positioned adjacent said outside surface with a substantial portion thereof lying on both sides of said pivotal axis, whereby, when the centers of the poles of said control unit magnet are placed on a line directly opposite the pivotal axis of said blade, a slight displacement of said controller unit relative to said follower unit toward either of said scraping edges will cause the approached edge of said blade to snap against said outside surface, thereby permitting the scraping edges of said blade to be brought alternately into scraping relation with said surface so that said follower unit can be made to scrape said outside surface in two directions.

2. An apparatus for removing snow and ice from the outside surface of an automobile windshield by remote control, comprising a controller unit adapted for movement over the inside surface of said windshield having a horseshoe-type permanent magnet mounted therein with both poles adjacent said inside surface, and a follower unit adapted for movement over the outside surface of said windshield in response to the movements of said controller unit, said follower unit including a blade member providing two oppositely disposed scraping edges, wheel means rotatably connected to said blade on an axis midway between said scraping edges and generally parallel thereto, said blade member assuming an inclination to said surface when either of said scraping edges is resting thereagainst, and a flat piece of soft iron capable of becoming magnetized by induction rigidly connected to said blade and positioned adjacent said outside surface with a substantial portion thereof lying on both sides of said pivotal axis, whereby, when the centers of the poles of said horseshoe-type magnet are placed on a line coinciding with said pivotal axis, a slight displacement of said controller unit relative to said follower unit towards either of said scraping edges will cause the approached edge of said blade to snap against said outside surface, thereby permitting both edges of said blade to be brought alternately into scraping relation with said outside surface.

3. The apparatus of claim 2 in which said wheels have sharp-edged peripheries to assist in removing the ice and snow from said windshield.

4. The apparatus of claim 2 in which the scraping edges of said blade are at a considerably greater inclination to the outside surface of said windshield than the body of said blade so that said edges strike against said surface with a substantially chopping action, whereby said scraping edges can be made alternately to strike against the outer surface of said windshield to assist in removing ice and snow therefrom.

References Cited in the file of this patent

UNITED STATES PATENTS

| | | |
|---|---|---|
| 1,749,049 | Turner | Mar. 4, 1930 |
| 1,758,723 | Thatcher | May 13, 1930 |
| 2,206,006 | Hendrey | June 25, 1940 |
| 2,507,559 | D'Andrea | May 16, 1950 |
| 2,634,444 | Coleman | Apr. 14, 1953 |